3,600,217
PROCESS FOR PRETREATING POLYESTER FILM SUPPORT FOR THE COATING WITH PHOTOGRAPHIC EMULSIONS
Georg Eichhorn and Lothar Richter, Berlin-Kopenick, Germany, assignors to VEB Fotochemische Werke Berlin, Berlin-Kopenick, Germany
No Drawing. Filed Mar. 4, 1968, Ser. No. 709,888
Int. Cl. B91m 1/18; G03c 1/78
U.S. Cl. 117—76                                    9 Claims

ABSTRACT OF THE DISCLOSURE

A process for pretreating a film support in order to increase its adhesiveness for the application of photographic emulsions, said support consisting of high molecular weight thermoplastic foils, particularly polyethylene terephthalate, wherein a substratum is used whose reactive components react on the support proper under the influence of heat.

---

This invention relates to a process of pretreating film support made of high molecular thermoplastic foils e.g. polyethylene terephthalate with a substratum for the coating with light-sensitive photographic emulsions.

It has been customary in the photographic industry for some time to use polyethylene terephthalate films and foils as support for light-sensitive gelatine-silver halide emulsions. This has had to overcome the particular difficulty which consisted in achieving a sufficient adherence of the hydrophylic, light-sensitive layer to the hydrophobic film support.

It is known that these difficulties may be overcome in general by providing with the film support a substratum effecting a strong bond between the film support and the light-sensitive emulsion so that a separation cannot take place either in dry or in the wet state.

One of the known conventional processes of pretreating a film support of polyethylene terephthalate for coating with photographic emulsions consists, for example, in coating thin layers of adhesive compositions constituted of plastics in combination with halogenated phenols and cresols, the molecules of the plastic containing reactive groups. These plastics are essentially copolymers of maleic anhydride with various vinyl monomers.

The preparation of copolymers of maleic anhydride and vinyl acetate at a temperature of 80° C. in a benzene solution is illustrated in DB Pat. 1,040,898 and their use on polyester film support in DAS (Deutsche Auslegeschrift) 1,166,616.

Furthermore, the preparation and use of terpolymers of alkylacrylates, vinylidene chloride and itaconic acid are illustrated in U.S. Pats. 2,698,235 and 3,228,770.

It is also known, to use soluble polyesters prepared from dimethylterephthalate and ethylene glycol, from glycols, isophthalic acid, terephthalic acid and saturated aliphatic dicarboxylic acids (the preparation of which is disclosed in British Pat. 1,014,344) as adhesive compounds for polyester film supports (this use being disclosed in U.S. Pat. 2,698,241).

A further means known for obtaining sufficient adhesiveness, is to modify chemically the surface of the support.

The above mentioned methods of preparing adhesive layers usually exhibit disadvantages, the principal shortcomings being the necessity to prepare the adhesive plastics in a separate step. These substances are then dissolved in the appropriate solvents and applied as coatings, to the film support. The methods of preparing the adhesive require a great deal of expensive technical equipment and raw materials and the costs are therefore prohibitive for the photographic film manufacturing industry.

It is an object of this invention to provide a process for pretreating high molecular weight thermoplastic particularly polyethylene terephthalate film supports, avoiding the disadvantages of the known processes.

It is a further object of the present invention to pretreat film supports of high molecular weight thermoplastic films and foils, especially of polyethylene terephthalate, with a substratum whose components react in situ on the film support proper to form an adhesive product in such a manner that a sufficiently strong connection between the film support and the light-sensitive emulsion is obtained not only in the dry but also in the wet state.

Other objects and advantages of the invention will become apparent from the following detailed description.

It was found that the periods necessary for preparing the substratum of the present invention are substantially shorter than the reaction periods of one to several hours necessary in the conventional processes for providing an adhesive substratum, particularly when the substratum composition is reacted under the conditions which are necessary for drying the substratum.

For that purpose the components are dissolved in solvents, or in mixtures thereof, suitable for the preparation of the film support and applied to the film support as a coating, preferably there are used mixtures of highly volatile and less volatile solvents, whereby the more volatile solvents rapidly evaporate, whereas the solvents with the high boiling points remain in the prepared layer and form the medium for the reaction now starting. The support is then placed into a drying zone where it remains for some time. The drying time and the drying temperatures determine the degree of the reaction of the adhesive substances prepared in this way.

The described reaction preferably is effected with polycarboxylic acids, having up to 12C atoms per molecule, or with their anhydrides. Particularly maleic acid, succinic acid, citric acid, itaconic acid, phthalic acid, or their anhydrides, as well as the derivatives of the cited acids or mixtures thereof are used for this reaction. As a further component, at least one poly-epoxide or polyalcohol is used. As epoxide compounds, the stable derivatives of cyanuric acid, or isocyanuric acid, particularly the triglycidyl compounds of the cited acids or of the mixtures of the acids are very useful. As the relatively non-volatile solvents which serve as the suitable reaction medium are, among others, dioxane, ethylene chlorhydrin, dimethyl sulfoxide, cyclohexanone, and dimethyl formamide. As the more volatile solvent for the reaction mixture we may use methanol acetone, methylene chloride, dichloroethane and others. For improving the swelling of the film support, the following additives can be used, e.g. aromatic hydroxy compounds, particularly phenol and alkylphenols, halogenated aromatic hydroxy-compounds, particularly halogenated phenol and alkylphenols, halogenated, particularly chlorinated aliphatic carboxylic acids or alkane bisphenols, or the derivatives thereof, the preferred amount being 1–10% by weight. The reactive agents are used in amounts of about 2.5 to 50 g. per liter substratum. The conditions for the reaction, under which the adhesive substances are prepared from the components on the film support, can be varied within wide limits. They are, of course, restricted by the conditions, especially the temperature, which would deteriorate the mechanical properties of the polyethylene-terephthalate film support. A reaction temperature of 150° C. should not be exceeded when the film support is of polyethylene terephthalate.

Temperatures between 80° C. and 150° C. are sufficient to start the necessary reaction of the components. The reaction times for the reaction of the mixtures of the components can be reduced by choosing suitable reaction mediums, or, alternatively, by raising the temperature. An equalizing of the reaction periods and the periods of passing the film support through the drying device for the adhesive layer, can therefore be brought about without difficulty.

The period of dwell in the drying device should not be less than 3 minutes and not more than 40 minutes, depending on the substances used. If the coating of the substratum has to be applied to a film moving at high speed, it is expedient to work in reaction mediums in which the reaction is accelerated, for example dimethyl sulfoxide, or to raise the temperature, using preferably 125° C.–145° C. It is further possible to accelerate the reaction by adding a catalyst, especially boron trifluoride in the form of its solution in ether. If desired, a triepoxide and a dicarboxylic acid may be employed in molar proportions of the former to the latter of 1:2 so that after reaction one carboxylic group per unit still remains free.

If necessary, the adhesion can be improved by applying additionally an auxiliary layer consisting of gelatine in aqueous methanol solution.

In the following, the invention will be described more fully in a number of examples but it should be understood that these are given by way of illustration and not of limitation and that many changes in the details can be made without departing from the spirit of the invention.

EXAMPLE 1

A film support of polyethylene terephthalate is provided with a substratum for a light-sensitive photographic emulsion to be subsequently applied by being coated with a solution of 6.0 g. triglycidylisocyanurate, 7.2 g. phthalic acid, 80 g. p-chloro-m-cresol, 50 ml. dioxane, 300 ml. methanol, and 700 ml. dichloroethane, the coating is then dried with a dwell time of the film support in the drying device of 30 min. at 90° C. After having been coated with a conventional light-sensitive gelatine-silver halide photographic emulsion, the film support results in a photographic material having an excellent adhesiveness in the dry and the wet state.

It is possible to coat onto the first layer a solution of 10 g. gelatine, 2 g. salicylic acid, 150 ml. water and 850 ml. methanol, as an additional or auxiliary layer.

EXAMPLE 2

A solution of 6 g. triglycidylisocyanurate, 4 g. itaconic acid, 50 g. p-chloro-m-cresol, 30 ml. dimethylsulfoxide, 240 ml. methanol, and 730 ml. dichloro-ethane is applied to the film support and dried within 18 min. at a temperature of 105° C. After coating with a conventional light-sensitive gelatine-silver halide photographic emulsion, a photographic material is obtained having an excellent adhesiveness in the dry and the wet state; the photographic emulsion will only peel off, when the film support reaches the melting point. It is possible to coat the first layer with a solution of 10 g. gelatine, 2 g. salicylic acid, 150 ml. water and 850 ml. methanol, as an additional layer.

EXAMPLE 3

Within a reaction period of 5 min., we prepare on a film support an adhesive layer consisting of a solution of 6.0 g. triglycidylisocyanurate, 4.8 g. phthalic acid, 3.2 g. maleic acid, 50 g. p-chloro-m-cresol, 50 ml. dioxane, 10 ml. dimethyl formamide, 24 ml. methanol and 700 ml. dichloroethane at a temperature of 135° C. After coating with an emulsion, a photographic material is obtained having an excellent adhesive power in the dry and the wet state.

It is possible to coat the first layer with a solution of 10 g. gelatine, 2 g. salicylic acid, 150 ml. water and 850 ml. methanol as an additional layer.

EXAMPLE 4

1.5 triglycidylisocyanurate, 0.5 g. sebacic acid, 0.3 g. phthalic acid, 20 ml. dioxane, 85 ml. dichloroethane, and 25 ml. methanol are reacted on a film support with addition of 1 ml. boron trifluoride etherate at a temperature of 100° C. for 20 minutes. After coating with a photographic emulsion, a film is obtained having excellent adhesiveness in the dry and in the wet state.

EXAMPLE 5

To 1.0 g. phthalic acid and 1.5 g. triglycidylisocyanurate, corresponding to a molar ratio of 1.2:1, 30 ml. dioxane, 90 ml. dichloroethane, and 30 ml. methanol and 20 g. p-chloro-m-cresol are added and esterification is carried out on the polyester foil for 11 minutes at 120° C. to the extent that of the three epoxide groups of the triglycidylisocyanurate one group remains intact. The free epoxide groups of the polyester molecule will cause rapid hardening of the gelatine after the coating of the photographic emulsion has been applied. The adhesive power of the light-sensitive layer on the supporting foil is excellent, particularly in photographic bath solutions. If hardening of the gelatine in the emulsion is desired originating from the layer of the reactive components, this can be further accelerated by using larger amounts of triglycidylisocyanurate. In general, it is desirable to operate with a molar proportion of triglycidylisocyanurate:acid about 1.2:1 since then the hardening effect originating from the prepared layer is sufficient.

EXAMPLE 6

9.2 g. glycerol are reacted on the film support with 17 g. phthalic acid anhydride, 10 ml. boron trifluoride-etherate, 20 ml. dimethylformamide, 240 ml. methanol, 720 ml. dichloroethane for 40 minutes at 140° C. The photographic emulsion coated thereon has very good adhesive power in the wet and in the dry state. It is possible to coat the first layer with a solution of 10 g. gelatine, 2 g. salicylic acid, 150 ml. water and 850 ml. methanol, as an additional layer.

While the invention has been described by reference to particular preferred embodiments thereof, the scope of the invention as defined by the appended claims is intended to encompass not only the foregoing description but also any obvious modifications and variations thereof.

What is claimed is:

1. A process for treating a film support of polyethylene terephthalate, comprising coating onto the film support a solution in a solvent effective to swell the film support of a first reactant comprising at least one of a polycarboxylic acid and acid anhydride having up to 12 carbon atoms per molecule and a second reactant comprising at least one of triglycidyl cyanurate and triglycidyl isocyanurate and heating the coated film support at a temperature of 80 to 150° C. and for a period of 3 to 40 minutes thereby to react said first and second reactants and dry the coating.

2. A process according to claim 1, in which the first reactant is maleic acid, succinic acid, citric acid, itaconic acid, phthalic aid, sebacic acid, maleic anhydride, succinic anhydride or phthalic anhydride.

3. A process according to claim 1, wherein the first reactant comprises a dicarboxylic acid and the second reactant comprises triglycidyl cyanurate or triglycidyl isocyanurate and the molar ratio of the first reactant to the second reactant is 2:1, so that after reaction one carboxylic group per unit still remains free.

4. A process according to claim 1, wherein the concentration of the reactants in the solution is from 2.5 to 50 g. per liter substratum.

5. A process according to claim 1, wherein the solvent comprises a mixture of at least one sparingly volatile solvent of the group consisting of dioxane, dimethyl sulfoxide, dimethyl formamide ethylene chlorohydrin and cyclohexanone and a more volatile solvent of the group consisting of dichloroethane, methylene chloride, methanol and acetone.

6. A process according to claim 1, wherein the solution contains a catalyst for the acceleration of the reaction.

7. The process according to claim 6, wherein the catalyst is an ether solution of boron trifluoride.

8. A process according to claim 1, wherein the solution contains 1 to 10% by weight of a compound promoting the swelling of the film support, selected from the group consisting of phenol, alkylphenols, halogen derivatives of phenol and alkylphenols, chlorinated aliphatic acids or alkane bisphenols.

9. A process according to claim 1, further comprising coating onto the dried and reacted coated film support an aqueous methanol solution of gelatine.

References Cited
UNITED STATES PATENTS

| | | | |
|---|---|---|---|
| 2,096,616 | 10/1937 | Nadeau | 95—9 |
| 3,128,265 | 4/1964 | Caldwell | 260—45.4 |
| 2,874,046 | 2/1959 | Klockgether | 96—87 |
| 2,872,427 | 2/1959 | Schroeder | 260—29.2 |
| 3,459,584 | 8/1969 | Caldwell | 117—72 |

NORMAN G. TORCHIN, Primary Examiner

E. C. KIMLIN, Assistant Examiner

U.S. Cl. X.R.

117—83, 138.8; 96—87, 75